(12) United States Patent
Tamkin et al.

(10) Patent No.: US 7,612,302 B2
(45) Date of Patent: Nov. 3, 2009

(54) SYSTEM AND METHOD FOR ALERTING AN OPERATOR

(75) Inventors: Ronald W. Tamkin, Pataskala, OH (US); J. Thomas King, Bexley, OH (US); Kevin A. Russo, Lewis Center, OH (US)

(73) Assignee: Mettler-Toledo, Inc., Columbus, OH (US)

( * ) Notice: Subject to any disclaimer, the term of this patent is extended or adjusted under 35 U.S.C. 154(b) by 0 days.

(21) Appl. No.: 11/696,392

(22) Filed: Apr. 4, 2007

(65) Prior Publication Data

US 2008/0245581 A1 Oct. 9, 2008

(51) Int. Cl.
*G01G 19/40* (2006.01)
*G08B 23/00* (2006.01)

(52) U.S. Cl. ............... 177/25.15; 235/383; 705/407; 340/502

(58) Field of Classification Search ... 177/25.11–25.19; 235/282, 383; 705/407, 414–416; 340/502
See application file for complete search history.

(56) References Cited

U.S. PATENT DOCUMENTS

| | | | | |
|---|---|---|---|---|
| 4,430,639 | A * | 2/1984 | Bennett et al. | 340/10.6 |
| 4,584,648 | A | 4/1986 | Dlugos | |
| 5,504,675 | A | 4/1996 | Cragun et al. | |
| 5,609,223 | A * | 3/1997 | Iizaka et al. | 186/61 |
| 6,175,315 | B1 * | 1/2001 | Millard et al. | 340/959 |
| 6,189,790 | B1 | 2/2001 | Walter | |
| 6,296,185 | B1 * | 10/2001 | Dejaeger | 235/383 |
| 6,390,363 | B1 * | 5/2002 | Morrison et al. | 235/383 |
| 6,408,279 | B1 * | 6/2002 | Mason | 705/16 |
| 6,540,137 | B1 * | 4/2003 | Forsythe et al. | 235/383 |
| 6,636,888 | B1 * | 10/2003 | Bookspan et al. | 709/203 |
| 6,864,436 | B1 * | 3/2005 | Nobes et al. | 177/25.13 |
| 6,884,946 | B2 | 4/2005 | Miller et al. | |
| 6,917,297 | B2 * | 7/2005 | Andrews et al. | 340/601 |
| 6,982,388 | B2 | 1/2006 | Kasinoff | |
| 7,305,244 | B2 * | 12/2007 | Blomqvist et al. | 455/456.5 |
| 2007/0051802 | A1 * | 3/2007 | Barber et al. | 235/383 |
| 2007/0202925 | A1 * | 8/2007 | Beith | 455/567 |
| 2008/0061139 | A1 * | 3/2008 | Roquemore | 235/383 |

OTHER PUBLICATIONS

Avery Weigh-Tronix, Avery Berkel M100 retail system scale, Oct. 5, 2004 Fairmont, MN, 2 pages.
Avery Weigh-Tronix, Avery Berkel M200 retail system scale, Oct. 5, 2004, Fairmont, MN, 2 pages.
Avery Berkel North America, MX410 multi-branch scale management system, Mar. 2002, LaPorte, IN, 4 pages.
Bizerba USA Inc., <<Class E-World>> CE-S, 98 90 0171011 2nd edition, 6 pages.
Rice Lake Weighing Systems, Ishida ScaleLink System Integration webpages, 2004, http://www.ishidaretail.com/products/specs/scallink.html, 3 pages.
Mettler-Toledo Inc., Fresh Solutions for Retail, Model UC-CW, 2006, Columbus, OH, 4 pages.

* cited by examiner

*Primary Examiner*—Randy W Gibson
(74) *Attorney, Agent, or Firm*—Standley Law Group LLP

(57) ABSTRACT

A system for alerting an operator of a weighing apparatus is described. The weighing apparatus may be capable of displaying a message in a message area to an operator. The message may be displayed in response to a command sent from a remote device.

20 Claims, 4 Drawing Sheets

US 7,612,302 B2

SYSTEM AND METHOD FOR ALERTING AN OPERATOR

BACKGROUND AND SUMMARY OF THE EXEMPLARY EMBODIMENTS

The exemplary embodiments relate generally to weighing apparatus having a user interface. More specifically, the exemplary embodiments relate to weighing apparatus having at least one operator interface, which may be adapted to display a message to an operator.

Weighing apparatus are well known. Presently, weighing apparatus are used in a variety of applications. For example, weighing apparatus may be used in retail and industrial applications. One exemplary retail application may be at a grocery store, such as in the grocery's deli, bakery, meat department or produce department. The weighing apparatus used in these applications may be capable of weighing a product and displaying the weight, unit price, total price and other information associated with the product. Such weighing apparatus may have a user interface that may allow the operator to perform one or more actions. These actions may include printing labels, looking up a price, looking up a PLU, overriding a transaction, voiding a transaction, administering to the weighing apparatus and other similar actions.

Currently, there is not an effective way of communicating information with operators of the weighing apparatus, for example, employees of a grocery store. Examples of information that may be communicated to users may include price changes, product additions, product recalls, product relabelling, instructions to employees and any other similar information. Presently, this information may be communicated through telephone calls, paper announcements on employee bulletin boards and/or intranet websites. These methods each have their own shortcomings. For example, telephone calls may or may not be answered due to the operators assisting customers; bulletin boards may or may not be reviewed by operators and if they are reviewed may not be reviewed on a timely basis; and intranet websites may not be viewed due to the fact that a separate personal computer must be utilized, which may not be in the same location as the weighing apparatus. Furthermore, each of these methods requires the operator to be away from the weighing apparatus to review the message. Having the operator away from the weighing apparatus means the operator is not available to assist customers, which may lead to unhappy customer and loss of sales.

The exemplary embodiments described below attempt to overcome or reduce these problems. The exemplary embodiments may be directed to a weighing apparatus. The weighing apparatus may have a platform that may to receive an object to be weighed and an operator display associated with the platform. A user interface, having a plurality of areas, at least one of the areas being a message area, may be presented on the operator display. A device may be connected to the weighing apparatus and may send a command to the weighing apparatus. The command may cause a message to be displayed in the message area of the operator display. This allows the operators to receive important messages at the weighing apparatus, so that they may remain near the customer. The messages may also be more likely to be seen since the operator spends a large amount of their time in front of the weighing apparatus and operator display.

BRIEF DESCRIPTION OF THE DRAWINGS

In addition to the features mentioned above, other aspects of the exemplary embodiments will be readily apparent from the following descriptions of the drawings, wherein like reference numerals across the several views refer to identical or equivalent features, and wherein.

DETAILED DESCRIPTION OF THE EXEMPLARY EMBODIMENT(S)

Figure 1:
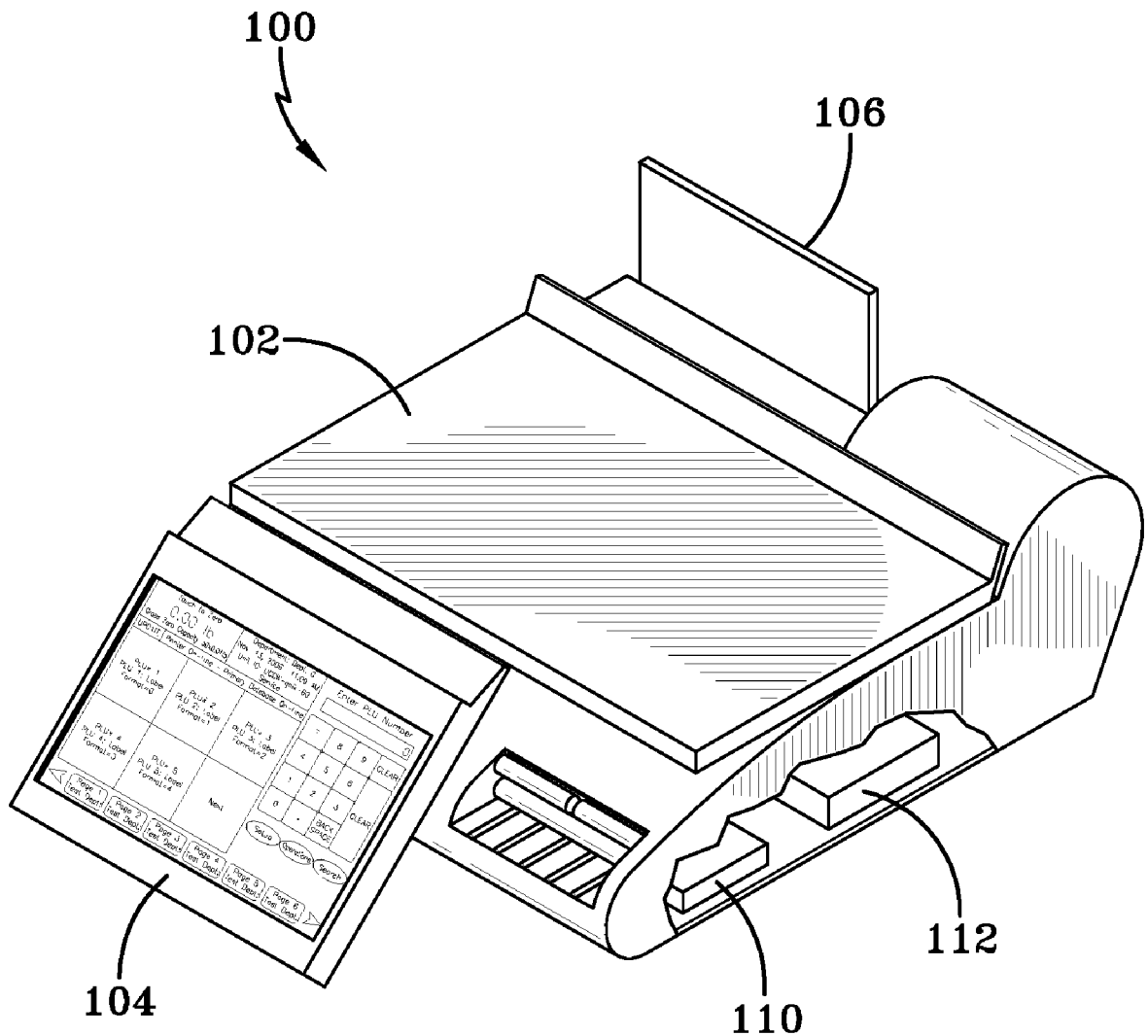
FIG. 1 illustrates a perspective view of one exemplary embodiment of a weighing apparatus.

FIG. 1 illustrates one exemplary embodiment of a weighing apparatus 100. The weighing apparatus 100 may have a force-measuring device (not shown) and platform 102. The force-measuring device may assist in determining the weight of an item that may be placed on the platform 102, as is known in the art. The force-measuring device can be any force-measuring device known in the art such as, but not limited to, a load cell. The weighing apparatus 100 may include an operator display 104. The operator display 104 can be integrated into the weighing apparatus 100 or be a standalone unit. The operator display 104 may generally face the operator of the weighing apparatus. The operator display 104 may be any display known in the art. For example, the operator display 104 can be a VF display, an LCD, a touch screen or any other similar display. The operator display 104 shown in FIG. 1 is a touch screen display. If a touch screen display is not used then it should be apparent that the operator display 104 could be coupled to one or more input devices such as, but not limited to, a keyboard, keypad, mouse or other similar input device. The operator display 104 may present a plurality of user interfaces 200, which will be discussed in more detail below. The weighing apparatus 100 may also include a customer display 106. The customer display 106 may generally face the customer. The customer display 106 may also be any display known in the art. The weighing apparatus 100 may contain a controller 110. The controller 110 may be a programmable device capable of receiving and executing commands. Any controller known in the art may be used in the weighing apparatus 100. For example, the controller 110 may be an integrated processor with memory, a personal computer running a WINDOWS operating system or any other similar configuration. In one exemplary embodiment, a database 112 may be included in the weighing apparatus 100. The database 112 may store the commands that may be sent to the weighing apparatus 100.

Figure 2:
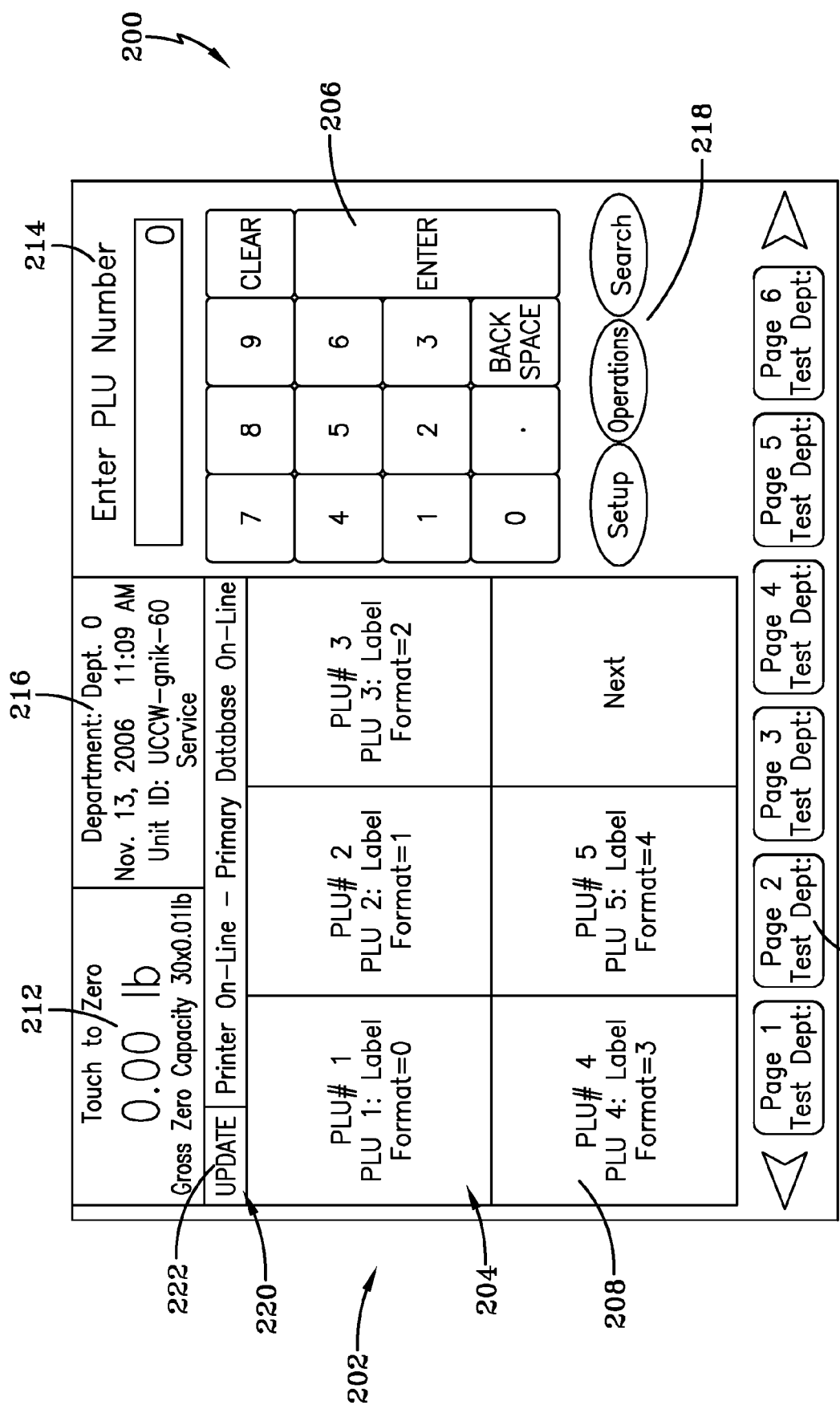
FIG. 2 illustrates an exemplary user interface of one exemplary embodiment of a weighing apparatus.

As stated above, the operator display 104 may present one or more user interfaces 200. The user interfaces 200 may have a plurality of defined areas 202. One such exemplary user interface 200, such as the PLU transaction interface 204 shown in FIG. 2, may have the following defined areas: keypad area 206, page preset area 208, preset tab area 210, weight area 212, PLU area 214, date and time area 216, admin area 218 and message area 220. Other interfaces with other defined areas are also possible. The defined areas 202 may present a subset of data to the operator which may be used in a plurality of functions. For example, the weight area 212 may present the weight of the item being weighed on the platform 102. The message area 220 may display a message to the operator, which may be sent from a remote location.

Figure 3:
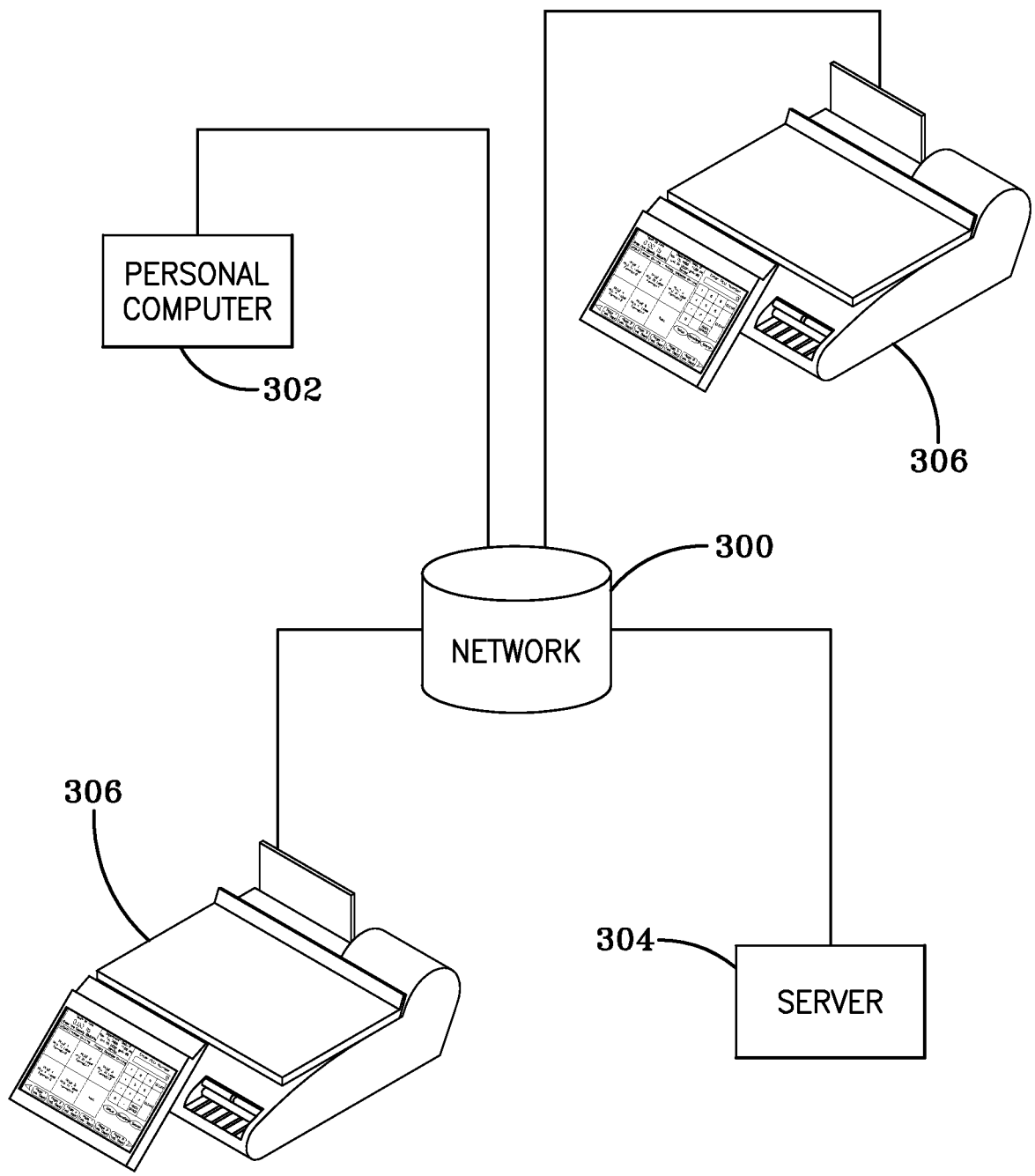
FIG. 3 illustrates a schematic of one exemplary embodiment of a weighing apparatus connected to a network.

As shown in FIG. 3, the weighing apparatus 100 may be connected to a network 300, such as a LAN, WAN or the Internet, for communicating with computers 302, servers 304 and/or weighing apparatus 306 connected to the network 300. The computers 302 may also be handheld devices, such as, but not limited to, PDAs, cell phones and similar devices. The computers 302, servers 304 and/or weighing apparatus 306 may be wired or wirelessly connected to the network 300. The network 300 may include weighing apparatus, computers and servers that may be disposed in a single department, multiple departments, a single store, multiple stores, or an entire company. The network 300 may allow a central location to send messages to thousands of weighing apparatus 100 around the world in a single command. In one exemplary embodiment, a database may be connected to the network for storing the commands and messages.

Figure 4:
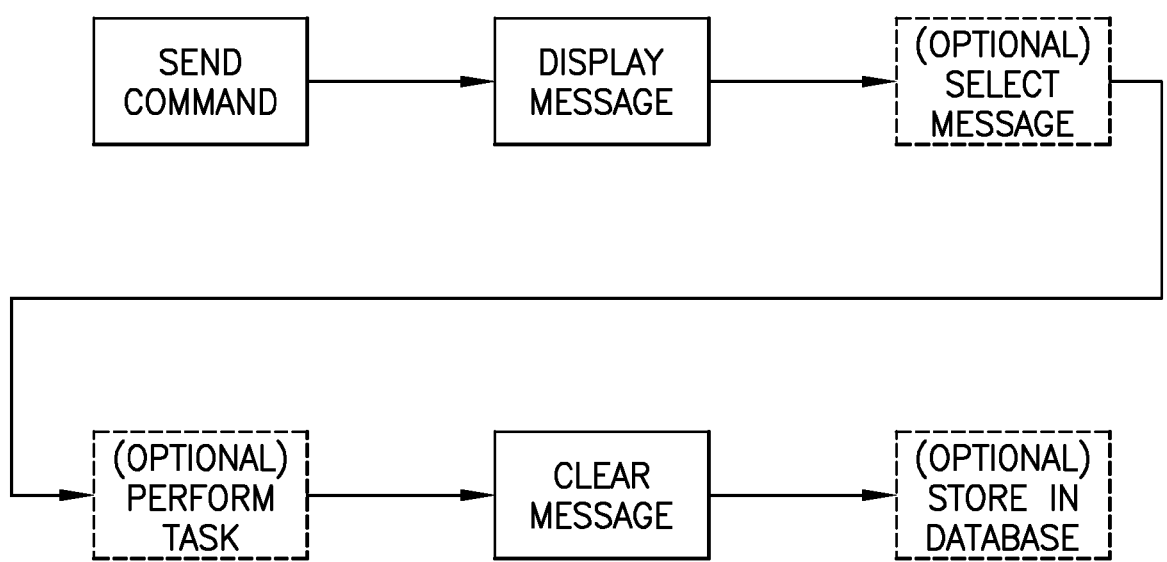
FIG. 4 illustrates a flow chart of one exemplary embodiment of a method of using the weighing apparatus.

As illustrated in FIG. 4, during normal operation of the weighing apparatus, the message area 220 may be blank. A command may be sent to the weighing apparatus 100. Upon receiving the command, a message 222 may be displayed in the message area 220. The command may be sent over the network 300 from a computer 302, a server, 304 or another weighing apparatus 306. The message may be any message, for example, a simple text string, a message alerting the operator that pricing has changed, a product has been recalled and/or a product has been added or deleted, a message directing the operator to an intranet posting for further information or any other similar message. The message may be displayed for a predetermined period of time, until another command is sent to turn off the message, until another command is sent to display a new message and/or until the message is cleared by the operator by pressing a button or similar operation. The message may be set to be displayed at a single weighing apparatus, all weighing apparatus or a subset of the weighing apparatus. The subset may be selected from a list of all of the weighing apparatus in a store or company, or the subset may be grouped by department and a single, a subset or all departments may be selected.

In another exemplary embodiment, the command may also include a task that may be required to be performed before the message may be cleared. For example, the message may be to remove all of a certain product from the shelves. Once the operator accomplishes the task, the operator may clear the message. Information, such as the message, the person clearing the message and the time the message is cleared may be entered into the database for tracking purposes. The command may also include an alert for changing prices. The alert may be selected and a batch mode run to change the prices.

In yet another exemplary embodiment, the message area 220 or message 222 may be selected and another action may be performed. For example, the operator could select the message area or message using the touch screen or other input device, like a mouse, keyboard or keypad. In response to selecting the area or message, the weighing apparatus may run a macro, launch an application, such as a web browser, and/or display another message area with additional text or tasks. Each of these steps may be entered into the database for tracking.

While certain exemplary embodiments are described in detail above, the scope of the invention is not to be considered limited by such disclosure, and modifications are possible without departing from the spirit of the invention as evidenced by the following claims:

What is claimed is:

1. A method for alerting an operator comprising:
   providing a retail scale having an operator display, said operator display having a user interface said user interface having an interactive message area;
   connecting a remote computer to said retail scale on a network;
   sending a command from said remote computer to said retail scale, said command unrelated to any transaction being concurrently processed by said retail scale;
   displaying a message in said message area of said retail scale in response to said command, said message being clearable only by a subsequent command from said remote computer;
   requiring that an operator acknowledge said message before said message can be cleared from said message area;
   receiving at said remote computer, confirmation that an operator has acknowledged said message on said retail scale; and
   upon receipt of said confirmation, sending a subsequent command from said remote computer to said retail scale that turns off said message.

2. The system method of claim 1 wherein selecting said message in said message area displays a larger message.

3. The method of claim 1 wherein the content of said message is selected from the group consisting of a price change alert, a product recall alert, and a product deletion alert.

4. The method of claim 1 wherein said message informs an operator of a task that must be performed, and the operator must confirm completion of said task before said subsequent command that turns off said message will be sent.

5. The method of claim 1 wherein said message directs an operator to an intranet or Internet site to provide more information related to said message.

6. The method of claim 1 wherein confirmation of said message is accomplished by an action selected from the group consisting of touching said message area of said user interface, selecting said message area of said user interface using a mouse, selecting said message area of said user interface using a keyboard, and selecting said message area of said user interface using a keypad.

7. The method of claim 1 further comprising:
   associating a database with said retail scale, said database adapted to store information related to said message.

8. The system method of claim 1 wherein selecting said message area launches a software application or macro.

9. A method for alerting an operator, comprising:
   providing a plurality of retail scales, each scale having an operator display, said operator display having a user interface, said user interface having a message area;
   providing a remote computer connected to said plurality of retail scales on a network;
   sending a command from said remote computer to at least one of said retail scales, said command unrelated to any transaction being concurrently processed by any retail scale receiving said command;
   displaying a message in said message area of each retail scale receiving said command, said message being clearable only by a subsequent command from said remote computer;
   requiring that an operator acknowledge said message on a given retail scale before said message can be cleared from said message area thereof;
   receiving at said remote computer confirmation that an operator has acknowledged said message on a given retail scale; and
   upon receipt of said confirmation, sending a subsequent command from said remote computer to said given retail scale that turns off said message.

10. The method of claim 9 wherein the content of said message is selected from the group consisting of a price change alert, a product recall alert, and a product deletion alert.

11. The method of claim 9 wherein said message informs an operator of a task that must be performed, and the operator must confirm completion of said task before said subsequent command that turns off said message will be sent.

12. The method of claim 9 wherein said message directs an operator to an intranet or Internet site to provide more information related to said message.

13. The method of claim 9 wherein selecting said message area launches a software application or macro.

14. The method of claim 13 further comprising:
displaying a larger message in response to selecting said message area.

15. The method of claim 9 further comprising:
storing information related to said message in a database.

16. The method of claim 9 wherein a command is sent to only a subset of a total number of retail scales to which said remote computer is connected.

17. The method of claim 9 wherein confirmation of said message is accomplished by an action selected from the group consisting of touching said message area of said user interface, selecting said message area of said user interface using a mouse, selecting said message area of said user interface using a keyboard, and selecting said message area of said user interface using a keypad.

18. The method of claim 9, further comprising a time delay between acknowledgment of said message and the sending of said subsequent command from said computer that turns off said message on said retail scale.

19. A method for alerting an operator, comprising:
providing a retail scale having an operator display, said operator display having a user interface, said user interface having a message area;
providing a remote computer connected to said retail scale on a network;
sending a command from said remote computer to said retail scale, said command unrelated to any transaction being concurrently processed by said retail scale;
displaying a message in said message area of said retail scale in response to said command, said message being clearable or alterable only by a subsequent command from said remote computer;
requiring that an operator acknowledge said message before said message can be cleared from said message area;
upon selection of said message area by an operator, receiving at said remote computer confirmation that an operator has acknowledged said message;
activating a timer upon receipt at said remote computer that said message has been acknowledged; and
upon expiration of timer operation, automatically sending a subsequent command from said remote computer to said retail scale that affects said message.

20. The method of claim 19, wherein the effect of said subsequent command is selected from the group consisting of turning off (clearing) said message, turning off (clearing) said message and displaying a new message in its place, and placing said message in a state wherein said message may be cleared by an operator.

* * * * *

UNITED STATES PATENT AND TRADEMARK OFFICE
CERTIFICATE OF CORRECTION

| | |
|---|---|
| PATENT NO. | : 7,612,302 B2 |
| APPLICATION NO. | : 11/696392 |
| DATED | : November 3, 2009 |
| INVENTOR(S) | : Tamkin et al. |

It is certified that error appears in the above-identified patent and that said Letters Patent is hereby corrected as shown below:

On the title page, Item (56) OTHER PUBLICATIONS, please delete "Avery Weigh-Tronix, Avery Berkel M100 retail system scale, Oct. 5, 2004 Fairmont, MN, 2 pages." and insert -- AVERY WEIGH-TRONIX, Avery Berkel M100 retail system scale, 2004, 10/05, Fairmont, MN, 2 pages. --.

On the title page, Item (56) OTHER PUBLICATIONS, please delete "Avery Weigh-Tronix, Avery Berkel M200 retail system scale, Oct. 5, 2004, Fairmont, MN, 2 pages." and insert -- 2 AVERY WEIGH-TRONIX, Avery Berkel M200 retail system scale, 2004, 10/05, Fairmont, MN, 2 pages. --.

In column 3, line 63, please delete "operator comprising:" and insert -- operator, comprising: --.

In column 4, line 17, please delete "system".

In column 4, line 40, please delete "system".

In column 4, line 59, please delete "computer confirmation" and insert -- computer, confirmation --.

Signed and Sealed this

Eighth Day of December, 2009

David J. Kappos
*Director of the United States Patent and Trademark Office*